A. F. COLLINS.
PERFORATING DEVICE FOR PROTECTING CHECKS AND LIKE INSTRUMENTS.
APPLICATION FILED SEPT. 12, 1919.
1,407,257.
Patented Feb. 21, 1922.
4 SHEETS—SHEET 1.
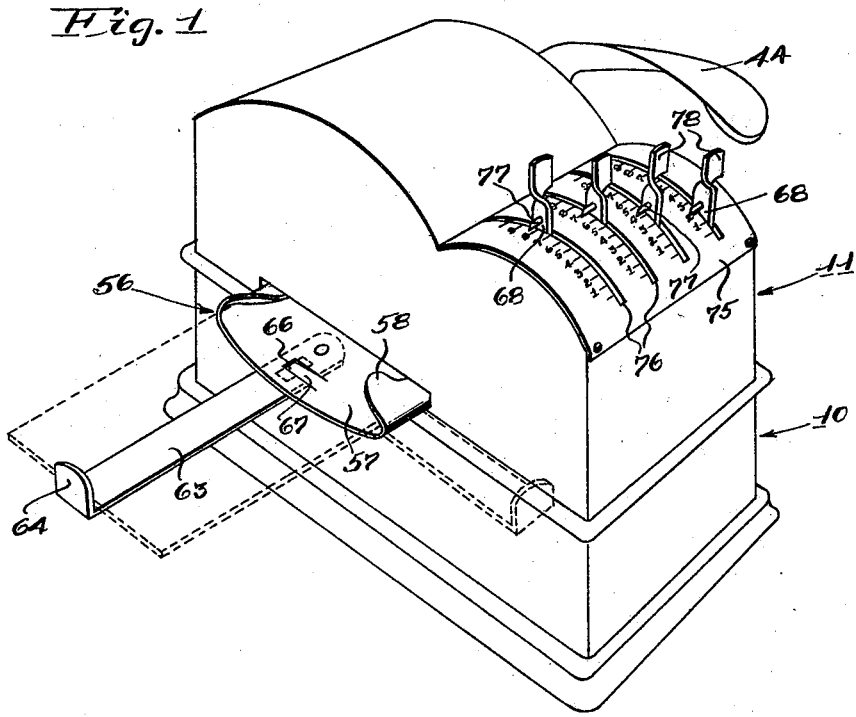
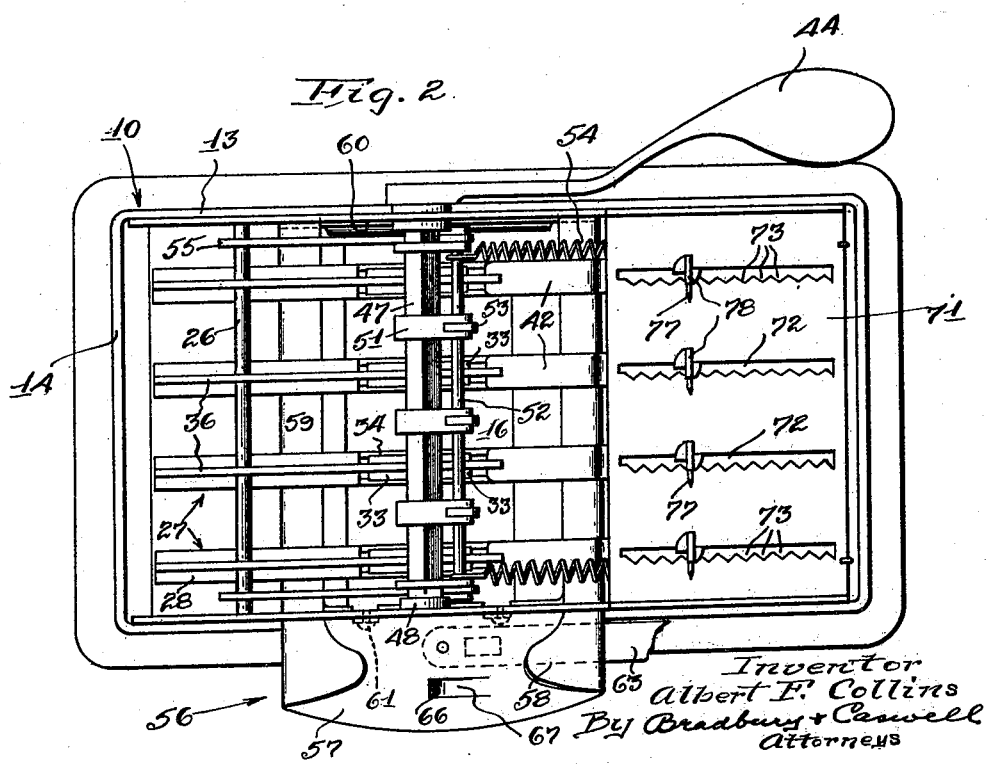

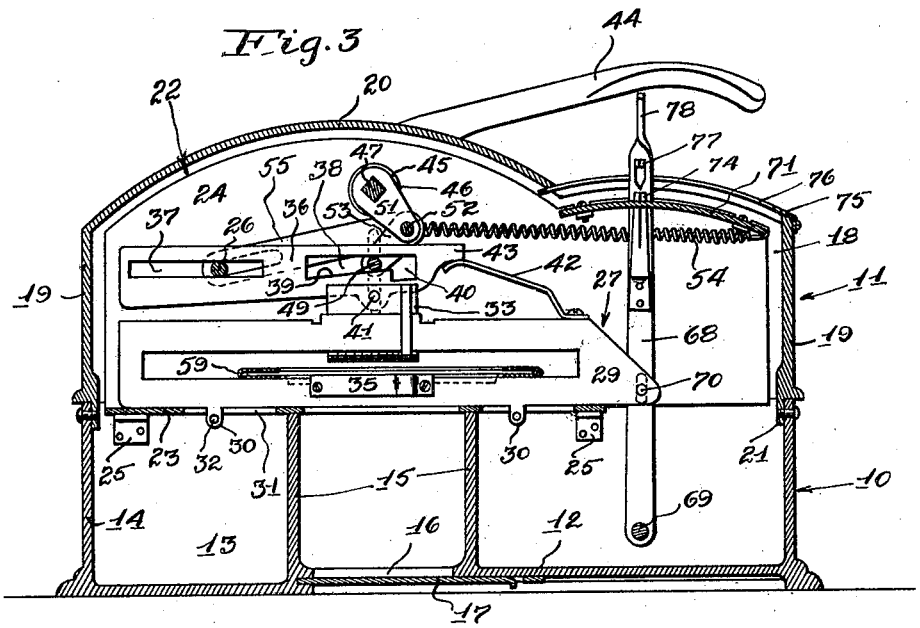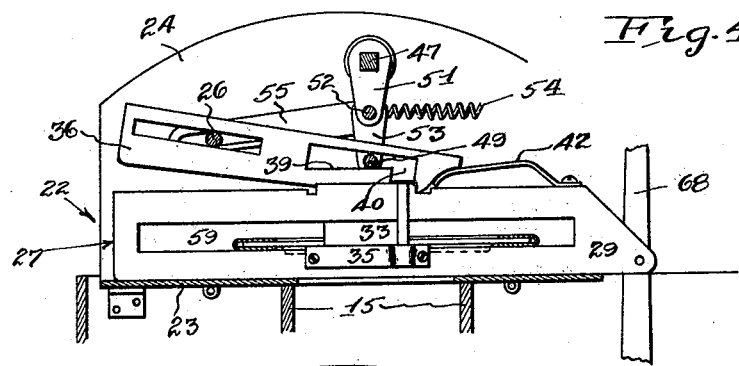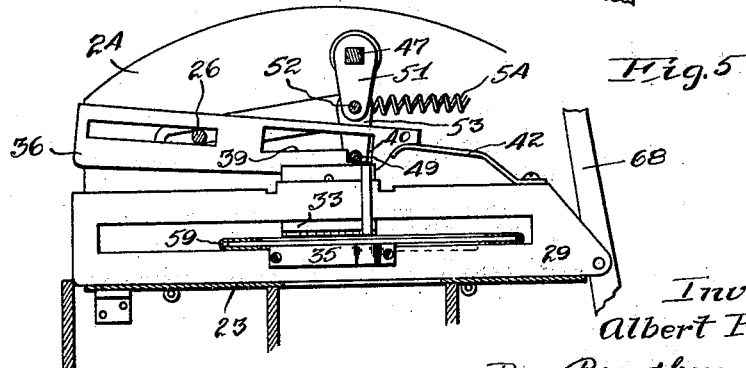

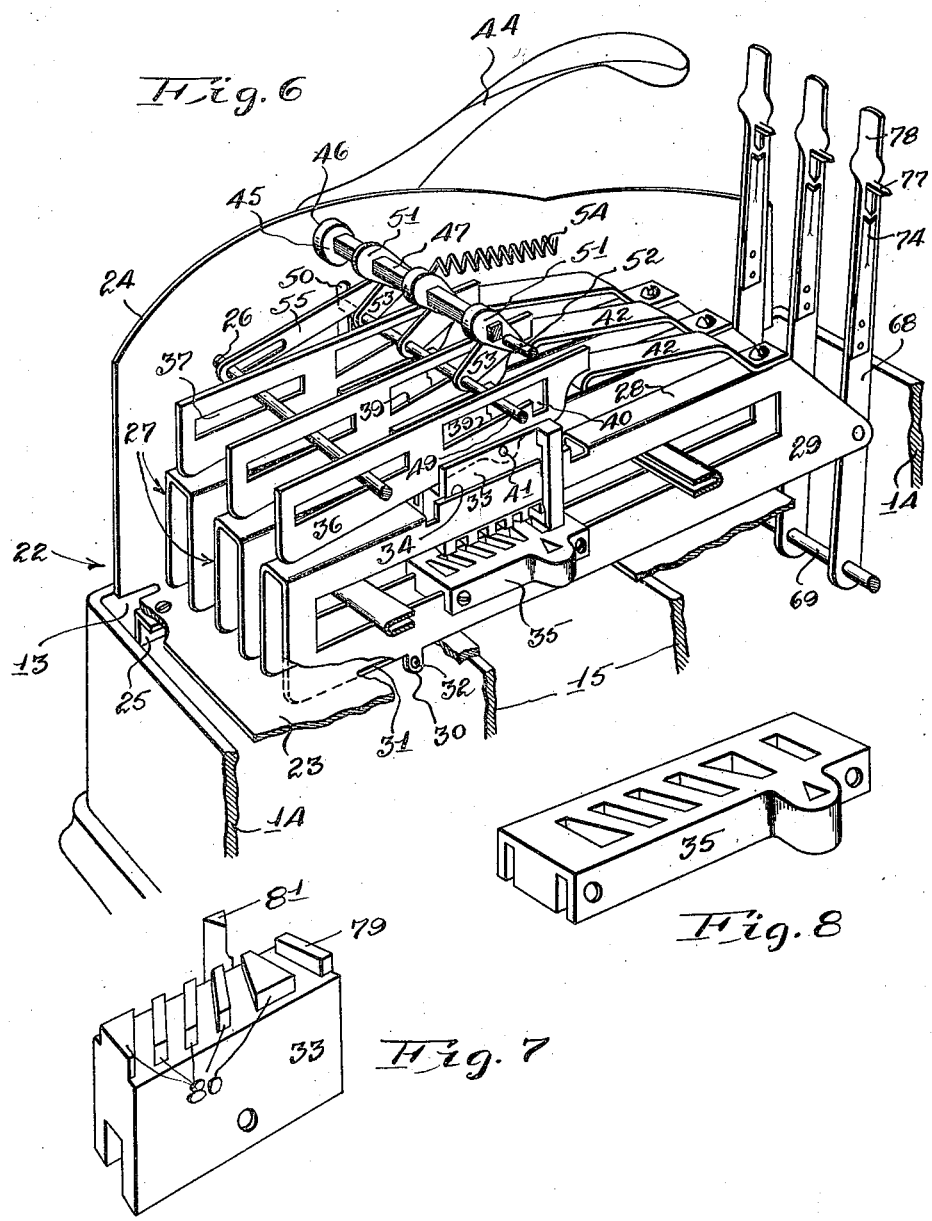

A. F. COLLINS.
PERFORATING DEVICE FOR PROTECTING CHECKS AND LIKE INSTRUMENTS.
APPLICATION FILED SEPT. 12, 1919.
1,407,257.
Patented Feb. 21, 1922.
4 SHEETS—SHEET 4.
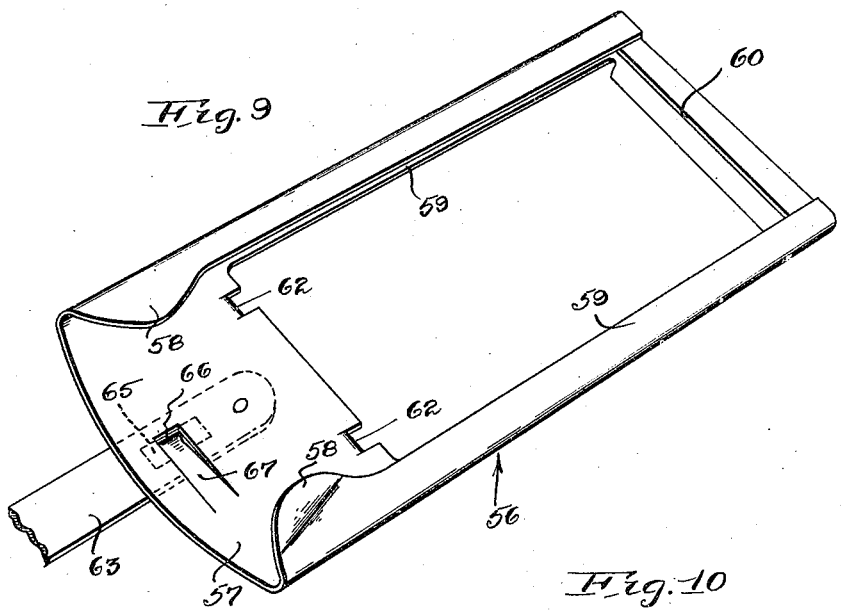
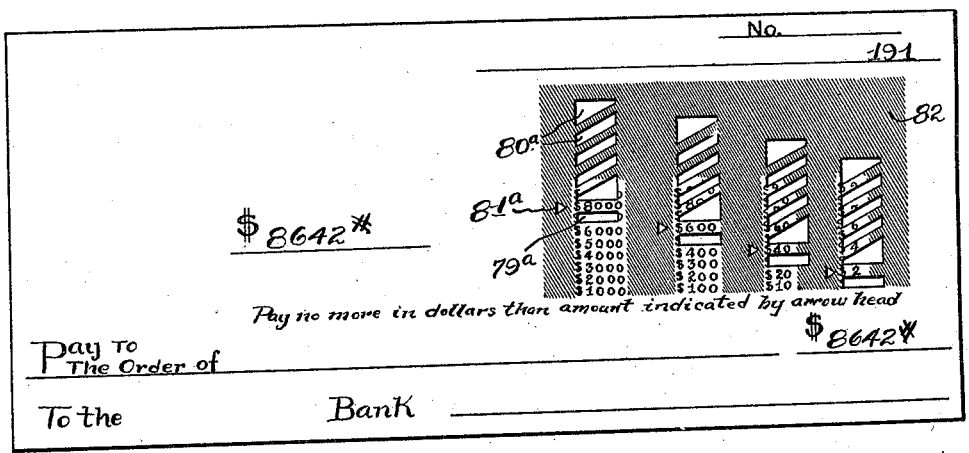
Inventor
Albert F. Collins
By Bradbury & Caswell
Attorneys

UNITED STATES PATENT OFFICE.

ALBERT F. COLLINS, OF MINNEAPOLIS, MINNESOTA.

PERFORATING DEVICE FOR PROTECTING CHECKS AND LIKE INSTRUMENTS.

1,407,257.      Specification of Letters Patent.     Patented Feb. 21, 1922.

Application filed September 12, 1919. Serial No. 323,397.

*To all whom it may concern:*

Be it known that I, ALBERT F. COLLINS, a citizen of the United States, residing at Minneapolis, in the county of Hennepin and State of Minnesota, have invented new and useful Improvements in Perforating Devices for Protecting Checks and like Instruments, of which the following is a specification.

My invention relates to improvements in perforating devices for protecting checks and like instruments.

Its object is to provide a simple, and durable device of this kind for perforating, at desired points, checks, bearing tables of figures, which, after being perforated, are indicative of the amounts for which the checks are drawn.

A further object is to provide a device of this character so designed that the necessary adjustments are quickly and readily made and the punching operation easily accomplished in a single movement.

A further object is to provide a device of this kind having a simple and efficient actuating mechanism connected with punching elements designed to cut singly, but in rapid succession, thereby minimizing the effort required in operating the device.

A further object is to provide in a device of this kind, a plurality of independent carriages each adapted to be set, in any one of several predetermined positions, said carriages being provided with dies in operative connection with a handle and adapted to be actuated upon a single stroke of said handle.

With the foregoing and other objects in view, which will appear in the following description, the invention resides in the novel combination and arrangement of parts and in the details of construction hereinafter described and claimed.

In the drawings, Fig. 1 is a perspective view illustrating my improved device; Fig. 2 is a plan view, the cover thereof being removed to show otherwise concealed parts; Fig. 3 is a central sectional view of said device; Figs. 4 and 5 are similar fragmentary views showing different positions of one of the die carriages and dies. Fig 6 is a fragmentary perspective view of the device showing a number of die carriages and mechanism connected therewith; Figs. 7 and 8 are perspective views in detail illustrating dies employed in my improved device; Fig. 9 is a perspective view in detail illustrating the check guide and a portion of the folding gage attached thereto and Fig. 10 is a plan view illustrating the type of check for which my device is adapted.

Referring to the drawings, I have used the reference numeral 10 to indicate the base and the numeral 11 to indicate the cover therefor. The base 10 includes a bottom 12 with sides 13, ends 14 and transverse partitions 15. Dies, hereinafter described, rest above the pocket formed between said partitions 15. Clippings from said dies collecting in this pocket are removed therefrom through an opening 16 normally closed by a slide 17 in the bottom 12 of the base. The cover 11, including sides 18, ends 19 and top 20, fits upon the base 10. Lugs 21 on the cover 19 overlap the inner margins of the base and provide means of attachment therewith. Within the base 10 and cover 11 is a frame 22 comprising a bed 23 with upturned sides 24. The bed 23 is supported near the center upon the portions 15 and near the ends thereof upon brackets 25 secured to the inner margins of the base. The sides 24 are connected by a tie and supporting rod 26. A plurality of spaced slidable carriages 27 are arranged side by side on the bed 23. These carriages are identical and a description of one will suffice for all. Each carriage is formed from a single piece of sheet metal bent to form a back 28 and vertical side members 29. Depending lugs 30, on said sides, rest in slots 31 in the bed, and pins 32 passing through opposite lugs 30 slidably secure the carriage upon said bed. Portions of the back 28 and side members 29 are cut away as clearly shown in Fig. 6. A die member 33 passing through the opening in the back is slidable in pressed ways 34 in the side members and a companion die 35, fixed on said side members beneath the slidable die, co-acts therewith when said slidable die is depressed. An equalizing bar 36 having a slot 37 therein to receive the supporting bar 26 is also formed with an aperture 38, which is constructed to provide an inclined slide 39 and a recess 40, the functions of which will hereinafter appear. This bar is pivotally attached to the slidable die 33 by means of a pintle 41 and said die is normally held in elevated position by a spring 42 secured to the back of the carriage and bearing upwardly against a projection 43 on the bar 36.

I provide means as follows for depressing the equalizing bars 36: An oscillatory handle 44 is formed with a boss 45 journaled in aligned openings 46 in one side of the cover and the adjacent side member 24 of the frame 22. This boss receives an operating rod 47, which is square throughout its length, except at the end opposite said boss, said end being round and journaled in a bearing 48 in the frame 22. A push rod 49, movable vertically at its ends in slots 50 in said frame, passes through the apertures 38 in the equalizing bars 36. A series of arms 51 fixed upon the square rod 47 carry a rod 52 which is connected with the push rod 49 by means of a series of spaced links 53. In the absence of pressure upon the handle 44, said handle is held in elevated position and the arms 51 and links 53 in folded positions (Fig. 6), by the action of tension springs 54, which are stretched between the rod 52 and the frame 22. Stop links 55 connected with said rod 52 and each having a limited slidable connection with the tie rod 26, limit the forward movement of the rod 52 by the action of said springs 54. When the handle 44 is depressed, the arms 51 and links 53 are brought into alignment (Fig. 4). The push rod 49, bearing down upon the equalizing bars 36 depresses the same against the action of the springs 42. When said push rod bears upon the slide 39 of an equalizing bar 36, the downward force exerted therefrom is transmitted to the center of the die 33, by reason of its pivotal connection with said equalizing bar, and said die is depressed, without binding, sufficiently to co-act with its companion member and thus perforate a sheet interposed between said dies. If a carriage 27 is situated so that the push rod 49 rests in the enlargement 40 of the aperture 38 in the equalizing bar 36 (Fig. 5), said push rod fails to cause the co-action of the dies in said carriage and the sheet between said dies is not perforated, as would otherwise result.

It will be remembered that each equalizing bar 36 has a slidable pivotal connection with the fixed supporting rod 26. I obtain the most efficient transmision of force from the push rod 49 to the slides 39, when the die members co-act in the various positions of the carriages, by inclining said slides with respect to the slots 37. As seen in Fig. 4 these slides rest horizontally or in other words, at right angles to the lines of force exerted by the push rod 49 and this situation exists in all of the various positions of said carriages.

A guide 56 for checks (Fig. 9) comprises a head 57 with flared lips 58, ways 59 and a stop 60. Said guide is inserted in slots in the cover 11 and side members 24 of the inner frames 22 and passes through the openings in the sides of the carriages 27. Screws 61 extending through down turned lugs 62 on the head of the guide pass into the frame 22 and secure the guide in such position that a check placed therein rests closely adjacent to the stationary dies 35 in the die carriages. A folding gauge 63 consists of a bar pivoted to the head of said guide, said bar having an upturned lug 64 at the free end thereof. The gauge in extended position receives a check (Fig. 1) when properly placed in the guide 56 and against the stop 60 therein. A depression 65 in the bar 63 receives the catch 66 on a yielding clip 67 punched from the head of the guide. Said clip 67 normally holds the gauge 63 in extended position but said gauge may be easily folded (dotted lines Fig. 1) if desired.

It is necessary to shift the die carriages 27 backward and forward to predetermined positions wherein desired perforations may be formed in checks, to indicate various amounts. Said carriages 27 are so moved by levers 68 pivoted at their lower ends upon a rod 69 in the base 10. Said levers are slotted midway thereof to receive pins 70 passing through the sides of their respective carriages. A quadrant 71 mounted on the inner frame 22 is supplied with slots 72, each receiving a lever 68. One side of each slot has notches 73 formed therein to receive a yielding dog 74 on the lever 68 passing therethrough. An indicator plate 75 on the cover 11 also has a series of slots 76 to receive said levers and adjacent to each slot is a scale graduated in accordance with the notches 73 in the quadrant 71. A pointer 77 on each lever covers the divisions in the scale beneath it and a twisted finger piece 78 at the tip of each lever provides for easily shifting the same. The spacing of the notches 73 in the quadrant 71 determines the length of each step taken by the carriages. These notches may be constructed, the carriages spaced and the dies so designed as to adapt my device to checks bearing various tables of figures for the protection thereof. I employ a peculiarly novel die adapted to perforate a check (Fig. 10) which constitutes the subject matter of a companion application filed herewith. Each set of dies includes cutting elements 79, 80 and 81 which respectively form an underscoring canceling perforation, 79$^a$ a group of angular canceling perforations 80$^a$ in alignment with said underscoring perforation, but spaced apart therefrom, and a guide or indicator perforation, 81$^a$ offset from said perforations 79$^a$ and 80$^a$ in position opposite the space between them. My improved check bears a plurality of columns of figures progressing decimally from one side to the other, the figures in each column representing progressively increasing amounts from bottom to top. Each column of figures is bounded on its sides and at the top thereof by a tinted or protected zone 82. The die carriages 27 are spaced so that the aligned perforations 79a and 80a are cut in the columns of figures and the offset guide perforations 81a are cut in the tinted zone 82. The cutting elements are so formed that the space opposite each guide perforation 81a is equal in width to the space occupied by figures in the columns and the notches 73 in the quadrant 71 are formed to locate the carriages 27 in such positions that an unmutilated figure will appear in each column opposite the adjacent guide perforation. These undisturbed indicative figures are determined in advance by adjusting the levers 68 with reference to the indicator 75.

From the foregoing, it will be seen that my improved die forms aligned perforations in different angular relations upon opposite sides of a given space and also forms a guide perforation offset from said aligned perforations and opposite said space. Figures upon a check appearing in these spaces are clearly discernable and an attempt to change the perforated protecting marks would be extremely difficult and easily detected.

To minimize the power required in depressing the handle 44, I have arranged the vertically slidable dies 33 at various heights with respect to the plane of the stationary dies 35, the differences in elevation of said dies being such that said dies cut singly, but in rapid succession during one stroke of the handle 44.

It will be understood that changes in the specific form of my invention, as herein disclosed, may be made within the scope of what is claimed, without departing from the spirit of my invention.

Having described my invention, what I claim as new and desire to protect by Letters Patent, is:

1. In a device of the class described, the combination of a base, a frame mounted on said base, a plurality of carriages slidable on said frame, co-acting dies carried by each carriage, a handle in operative connection with said dies for actuating the same, each of said dies having cutting elements thereon designed to form aligned perforations in different angular relation upon opposite sides of a space and also form a guide perforation opposite said space and in position offset from said aligned perforations.

2. In a device of the class described, the combination of a base, a cover for said base, an inner frame mounted within said base and cover, a plurality of carriages slidable on said frame, a stationary die member and a vertically slidable die member on each carriage, an equalizing bar for each slidable die member, a vertically slidable push rod in operative connection with said equalizing bars and a handle in operative connection with said push rod for actuating the same.

3. In a device of the class described, the combination of a frame, a carriage adjustable on said frame, a stationary die member and a vertically slidable coacting die member on said carriage, a supporting rod in the frame, an equalizing bar having a slidable pivotal connection with said rod and a pivotal connection with said slidable die member, a push rod bearing upon said equalizing bar, an operating rod, a handle for turning the same and folding links connecting said operating and push rods, said links being adapted, when extended, to cause the coaction of the slidable die member with its companion member.

4. In a device of the class described, the combination of a frame, a carriage adjustable on said frame, a stationary die member and a vertically slidable coacting die member on said carriage, a supporting rod in the frame, an equalizing bar having a slot therein to receive said supporting rod and a pivotal connection with slidable die member, a push rod bearing upon said equalizing bar, said bar being formed with a bearing surface for said rod in inclined relation with respect to said slot, an operating rod, a handle for turning the same and folding links connecting said operating and push rods, said links being adapted, when extended, to cause the coaction of the slidable die member with its companion member.

5. In a device of the class described, the combination of a frame, a plurality of carriages horizontally adjustable on said frame, a fixed and a vertically slidable die member on each carriage, an operating rod, a handle for turning said rod, a push rod, folding links connecting said push rod with the operating rod and equalizing connecting means between said push rod and the slidable die members.

6. In a device of the class described, the combination of a frame, a carriage slidably adjustable on the frame, a fixed die and a vertically slidable die on said carriage, an equalizing bar pivoted to said slidable die, means for depressing said bar and yielding means between said carriage and bar for lifting the latter.

7. In a device of the class described, the combination of a frame, a carriage slidably adjustable on the frame, die members on the carriage, one of said members being movable with respect to the other, a slidable die actuating bar associated with said movable die member and means adapted to operate said bar only in certain positions of adjustment of said carriage.

Signed at Minneapolis, in the county of Hennepin and State of Minnesota, this 5th day of September, 1919.

ALBERT F. COLLINS.